Patented Apr. 7, 1936

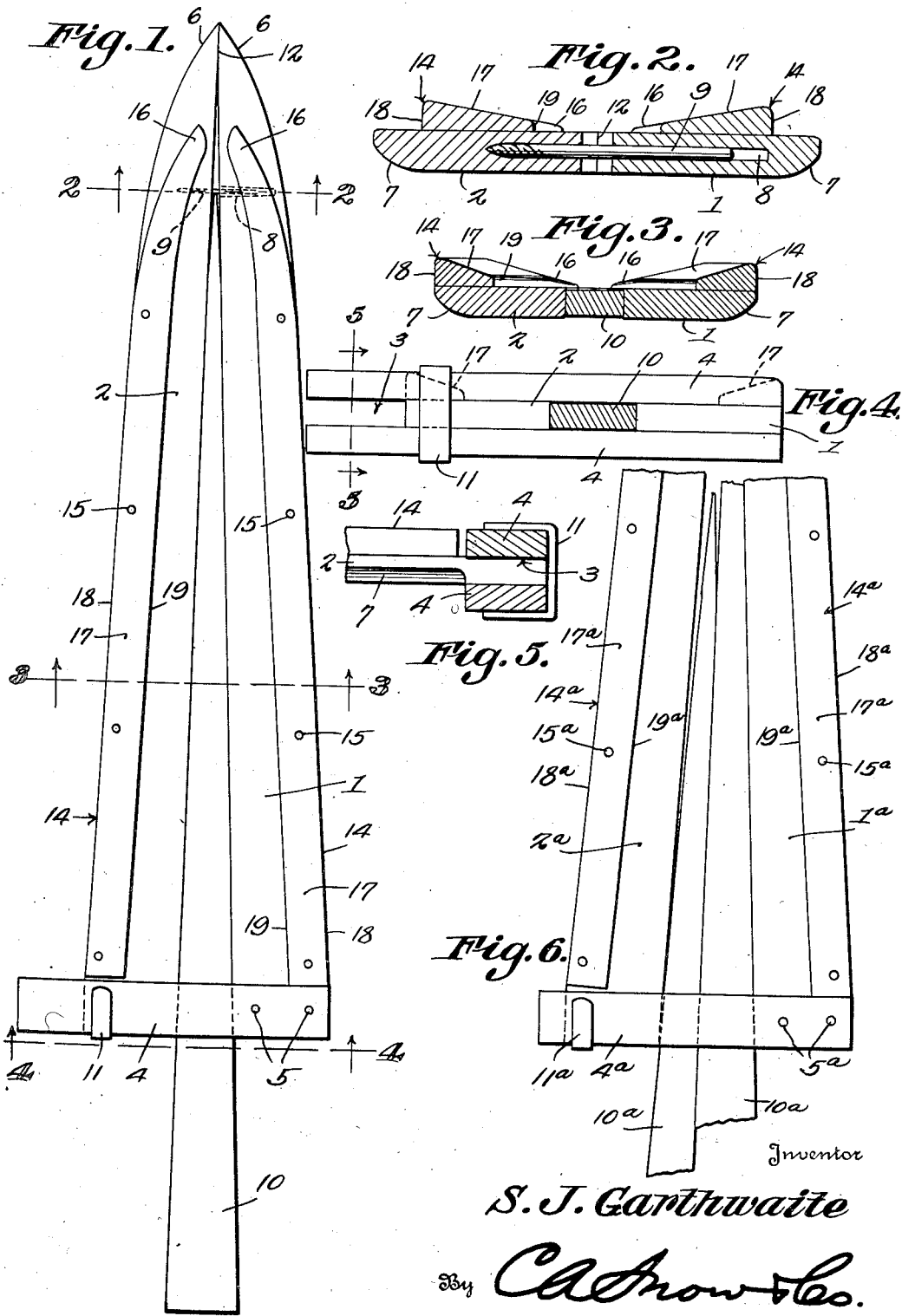

2,036,627

UNITED STATES PATENT OFFICE 2,036,627

FUR STRETCHER

Samuel John Garthwaite, Catawissa, Pa., assignor of one-half to Samuel Garthwaite, Milton, Pa.

Application April 10, 1935, Serial No. 15,648

3 Claims. (Cl. 149—21)

The device forming the subject matter of this application is adapted to be used for stretching the pelts of all fur-bearing animals, during the drying thereof, and one object of the invention is to provide novel means whereby the back portion of the pelt will be stretched properly, such stretching taking place without any interference due to the fact that a stretching of the nose of the pelt occurs, a stretching of the nose of the pelt being avoided in the device forming the subject matter of this application. Another object of the invention is to provide novel means for producing relative movement between the spreaders. Another object of the invention is to supply novel means for holding the spreaders in proper relation to each other, and for stopping the advancing movement of the expander, so that the spreaders will not be separated at their forward ends, where they enter the nose of the pelt. Another object of the invention is to provide novel means whereby the hair on the back portion of the pelt is left free during the drying, so that the hair on the back portion of the pelt will not be matted down.

It is within the purview of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in top plan, a device constructed in accordance with the invention;

Fig. 2 is a transverse section on the line 2—2 of Fig. 1;

Fig. 3 is a transverse section on the line 3—3 of Fig. 1;

Fig. 4 is a transverse section on the line 4—4 of Fig. 1;

Fig. 5 is a fragmental longitudinal section showing the yoke in place;

Fig. 6 is a top plan showing a modification, parts being broken away.

The device forming the subject matter of this application comprises a first spreader 1 and a second spreader 2, each in the form of an elongated plate, made of wood or any other suitable material. At its rear end, the first spreader 1 has a transverse guideway 3 (Fig. 4) which may be formed conveniently by parallel strips 4, attached at one end by securing elements 5 to the first spreader 1. The rear end of the second spreader 2 has free transverse movement, in and out, in the guideway 3. At their forward ends, the spreaders 1 and 2 are pointed, as shown at 6. From their outer edges, the spreaders 1 and 2 are inwardly and downwardly beveled, as shown at 7 in Fig. 2. Such terms as "downwardly", "upper", "lower" and the like are used to define the relative positions of various parts, as a matter of convenience, and do not imply that either surface of the article must be disposed uppermost. Near to its forward end, the spreader 1 is provided in its inner edge with a transverse bore or guide 8, receiving slidably one end of a pin or similar projection 9, having its opposite end fixedly mounted in the spreader 2.

The spreaders 1 and 2 are separated, to stretch the pelt, throughout the major portion of their length, by a wedge-shaped expander 10 which is inserted between the spreaders. In order to prevent the strips 4 that form the guideway 3 from springing apart at their free ends, a U-shaped, removable yoke 11 may be slipped over the strips 4. It is seldom necessary to use the yoke 11 when but one expander 10 is used, but when two expanders are employed, as shown in Fig. 6, it is a good plan to reenforce the strips by placing the yoke 11 upon them. In Fig. 6, parts hereinbefore described have been designated by numerals already used, with the suffix "a".

It is to be observed that the end of the expander 10 engages the pin 9 (Fig. 1), before the expander has been advanced far enough to separate the forward ends of the spreads 1 and 2. The spreaders 1 and 2 always remain in contact at or closely adjacent to their forward ends, as shown at 12.

Ribs 14 are secured at 15 to the upper surfaces of the spreaders 1 and 2. Throughout the major portion of their length, the outer edges of the ribs 14 are flush with the outer edges of the spreaders 1 and 2, but the ribs 14 have inwardly inclined ends 16, located over the bore 8 in the spreader 1, and over that part of the pin 9 that is mounted in the spreader 2. The ribs 14 are not circular or semi-circular in cross section, but have inwardly and downwardly inclined surfaces 17, extended continuously from the outer edges 18 of the ribs to the inner edges 19 thereof.

The pelt is placed about the spreaders 1 and 2, with the back of the pelt over the ribs 14, the rear portions of the belly of the pelt, the tail, and the back being tacked to the spreaders 2 and 1. The expander 10, (or the two expanders 10a of Fig. 6) is inserted between the spreaders 1 and 2, the spreaders are separated, save at their forward ends, at the place marked by the numeral 12 in Fig. 1, and the pelt is stretched. Such, grossly considered, is the operation of the device. There are, however, several distinguishing characteristics to be taken under careful consideration.

As to the function of the inwardly and downwardly inclined surfaces 7 of the spreaders 1 and 2, it is to be observed that because the spreaders 1 and 2 are cut away as shown at 7, more of the back part of the pelt is permitted to lie on top of the device, and above the ribs 14. This is desirable because the back portion of the pelt is the best part of the pelt, and more of it is subjected to the beneficial action of the ribs 14. As to the benefit derived by the use of the ribs 14, it may be observed that the ribs space the back part of the pelt from the spreaders 1 and 2, so that the hot air from the drier in which the article is placed can get in readily underneath the back part of the pelt. Because the ribs 14 have the inwardly and downwardly inclined surfaces 17, extending inwardly, continuously, from the outer edges 18 of the ribs to the inner edges 19 thereof, practically all of the hair on the back part of the pelt keeps its natural position and is not flattened down by contact with the spreaders 1 and 2. This leaves the hair on the back part of the pelt in good condition, and much time is saved in combing up and finishing the back part of the pelt. As a matter of practice, a pelt dried on the device forming the subject matter of this application can be combed up and finished in about one-fifth of the time required if the hair on the back part of the pelt is mashed down by contact with the spreaders 1 and 2.

The pin 9 serves two purposes. First, it keeps the forward ends of the spreaders 1 and 2 in the same plane. The forward ends of the spreaders 1 and 2 never become crossed on each other, to the distortion and damage of the pelt. Moreover, because the spreaders 1 and 2 are held in the same plane by the pin 9, the spreaders always are in pivotal contact with each other, at the place marked by the numeral 12 in Fig. 1. The second office performed by the pin 9 is that it stops the forward movement of the expander 10, before the expander has been advanced far enough to separate the expanders 1 and 2 at the place 12. This is important, because if the spreaders 1 and 2 are separated at their forward ends, the back part of the pelt, which is the valuable part thereof, gets a degree of stretching, and a kind of stretching, which is not only objectionable, but positively detrimental. The fact that the nose portion of the pelt gets little or no stretching due to the insertion of the expander 10, is of no consequence, since the nose of a skunk pelt is poor stuff and is cut off anyhow, for use on toys and the like, where a poor grade of fur, inadequately stretched, will answer the purpose: and in connection with other pelts, such as fox, coon, mink and others, the head or nose portion, although of value, is thin and does not need stretching. In other words, by sacrificing the inferior nose portion of the pelt in the stretching operation, the back portion of the pelt, which is the important part, is made the more valuable.

By curving inwardly the ends 16 of the ribs 14, so that they lie above the bore or guide 8 and the inserted end of the pin 9, the spreaders 1 and 2 are reenforced at a place where they need reenforcement.

It is not necessary to separate the spreaders 1 and 2 by hand. The separation of the spreaders begin when the point of the expander 10 begins to enter between the spreaders, and continues until the point of the expander 10 engages the pin 9. By that time, the longitudinal edges of the expander 10 are in contact, throughout practically their entire length, with the inner edges of the spreaders 1 and 2, and it is unnecessary to attach the spreader 2 to the strips 4, by a nail or otherwise.

Having thus described the invention, what is claimed is:

1. In a device of the class described, spreaders, means for separating the spreaders, the spreaders being beveled downwardly and inwardly on their lower surfaces, from their outer longitudinal edges, and ribs on the upper surfaces of the spreaders, said ribs being provided with inclined surfaces which slope transversely from the outer edges of the ribs to the inner edges of the ribs.

2. In a device of the class described, spreaders, strips carried by one of the spreaders and having free ends forming a guideway in which the other of the spreaders slides, and into which said other of the spreaders may be inserted transversely, an expander insertable between the spreaders, and a readily-removable yoke detachably engaged with the free ends of the strips, and holding them in approximately parallel relation.

3. A device of the class described, constructed as set forth in claim 1, one spreader being provided in its inner edge with a guide, a projection slidably received in the guide, a portion of the projection being mounted in the other spreader, the ends of the ribs being extended toward each other, to lie over the guide and over the portion of the projection that is mounted in said other spreader, thereby to reenforce the spreaders at the guide and where the projection is inserted into said other spreader.

SAMUEL JOHN GARTHWAITE.